(12) United States Patent
Seo

(10) Patent No.: US 7,805,855 B2
(45) Date of Patent: Oct. 5, 2010

(54) TAPE MEASURE WITH MAGNETIC TIP

(76) Inventor: Jae Young Seo, 527dong 803ho, Doosan Apt., Muk 1-dong, Jungnang-gu, Seoul (KR) 131-141

( * ) Notice: Subject to any disclaimer, the term of this patent is extended or adjusted under 35 U.S.C. 154(b) by 0 days.

(21) Appl. No.: 12/654,985

(22) Filed: Jan. 12, 2010

(65) Prior Publication Data

US 2010/0175273 A1 Jul. 15, 2010

(30) Foreign Application Priority Data

Jan. 13, 2009 (KR) .................... 10-2009-0002534

(51) Int. Cl.
*G01B 3/10* (2006.01)
(52) U.S. Cl. .......................... 33/758; 33/770
(58) Field of Classification Search .................. 33/347, 33/757, 758, 770, DIG. 1
See application file for complete search history.

(56) References Cited

U.S. PATENT DOCUMENTS

| | | | |
|---|---|---|---|
| 5,544,420 A | 8/1996 | Choi | |
| 5,815,940 A | 10/1998 | Valentine, Sr. | |
| 6,070,338 A | 6/2000 | Garity | |
| 6,073,983 A | 6/2000 | Schroeder | |
| 6,115,931 A | 9/2000 | Arcand | |
| 6,226,886 B1 | 5/2001 | Lamond et al. | |
| 6,442,863 B1 | 9/2002 | Poineau et al. | |
| 6,678,967 B1 | 1/2004 | Jueneman | |
| 2003/0167651 A1* | 9/2003 | Pedersen | 33/758 |
| 2006/0283036 A1* | 12/2006 | Huang | 33/758 |
| 2009/0031576 A1* | 2/2009 | Huang | 33/758 |
| 2009/0064525 A1* | 3/2009 | Chen | 33/758 |
| 2009/0178291 A1* | 7/2009 | Huang | 33/770 |
| 2009/0288307 A1* | 11/2009 | Zhou | 33/758 |
| 2010/0050456 A1* | 3/2010 | Huang | 33/770 |

FOREIGN PATENT DOCUMENTS

| | | |
|---|---|---|
| JP | 2007-215342 | 8/2007 |
| KR | 20-0385910 | 6/2005 |

OTHER PUBLICATIONS

Korean Office Action dated Jun. 28, 2009 in Korean Patent Application 10-2009-0002534 (with English translation).

* cited by examiner

*Primary Examiner*—G. Bradley Bennett
(74) *Attorney, Agent, or Firm*—Wenderoth, Lind & Ponack, L.L.P.

(57) ABSTRACT

Disclosed herein is a tape measure with a magnetic tip. The tape measure is constructed so that a first magnet is provided in an end hook of the tape measure in a more convenient manner using insert molding, and the removal of the magnet from the end hook is more reliably prevented using a first coupling part.

7 Claims, 6 Drawing Sheets

[Fig. 1]
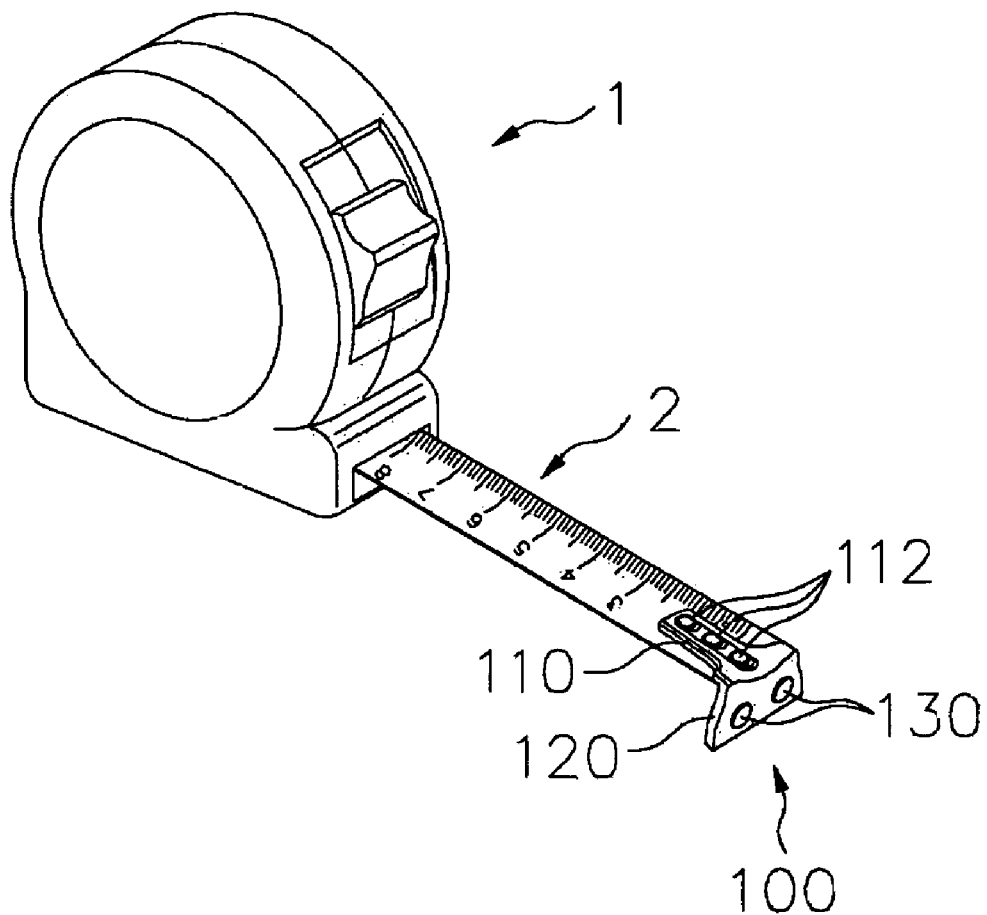
[Fig. 2]
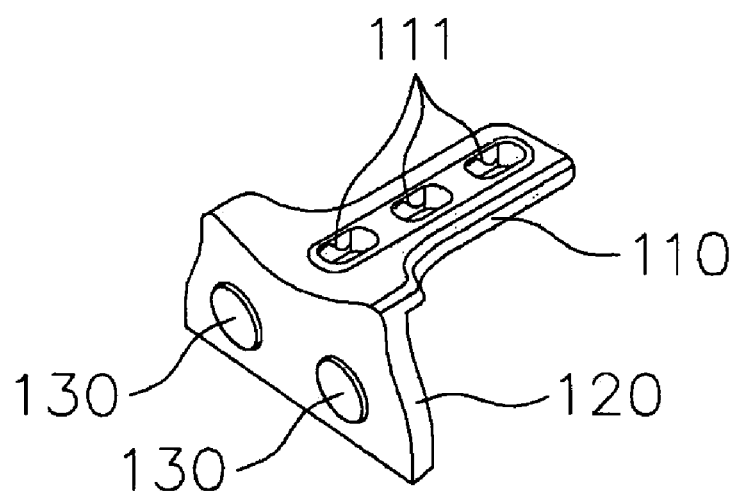

[Fig. 3]
100
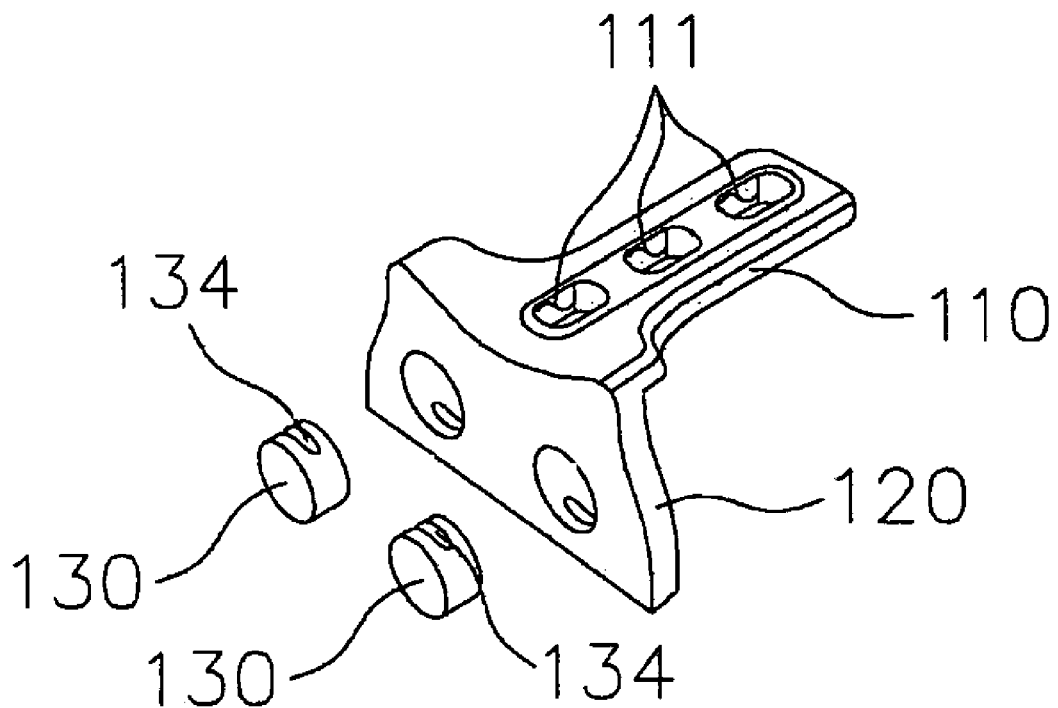
[Fig. 4]
100
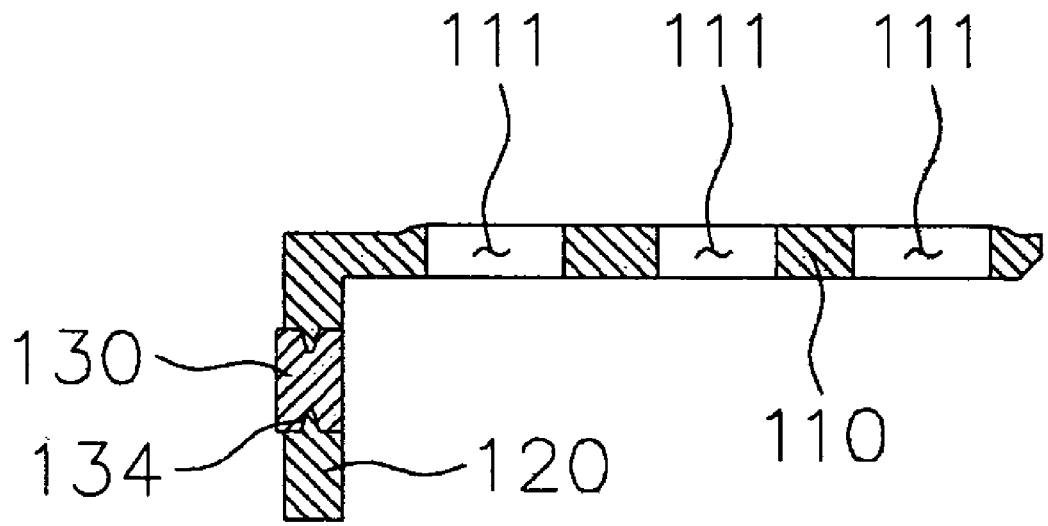

[Fig. 5]

|   | I | II | III | IV | V |
|---|---|---|---|---|---|
| 1 | 134 | 134 | 134 | 133 | 132 |
| 2 | | | | | |
| 3 | | | | | |
| 4 | | | | | |
| 5 | | | | | |
| 6 | | | | | |
| 7 | | | | | |
| 8 | | | | | |

[Fig. 6]
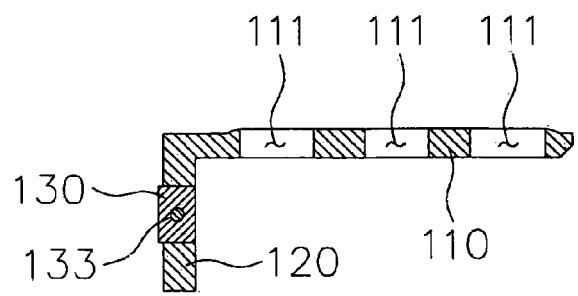
[Fig. 7]
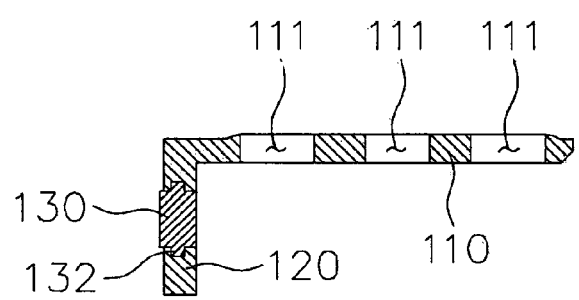
[Fig. 8]
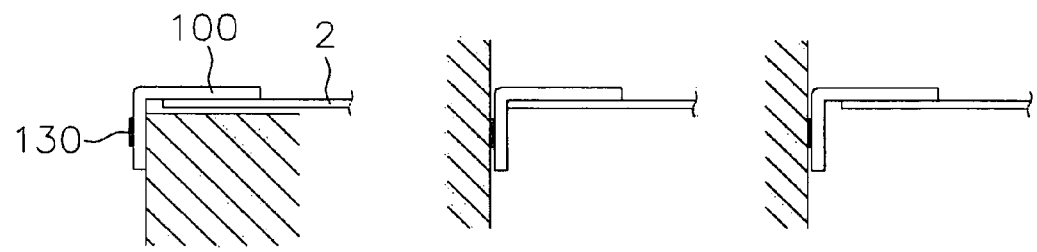

[Fig. 9]
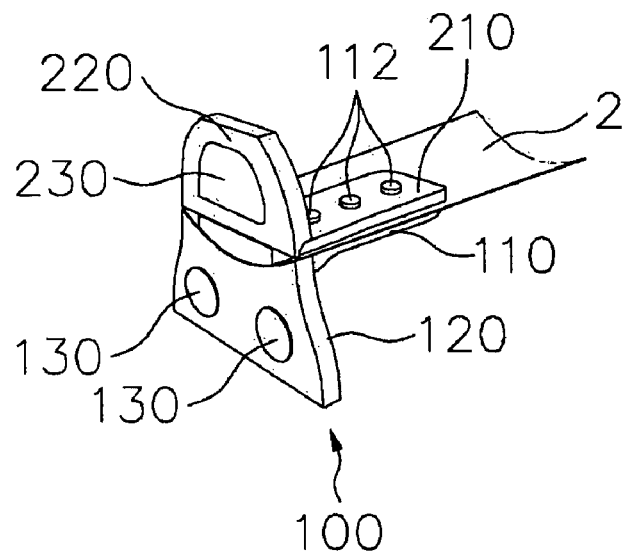
[Fig. 10]
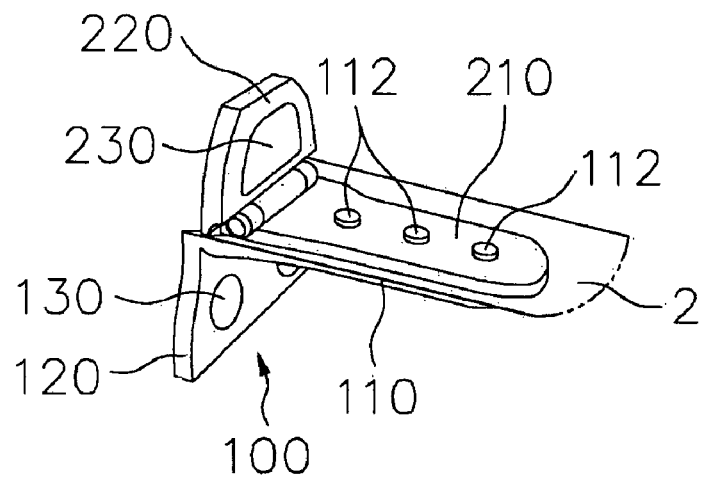
[Fig. 11]
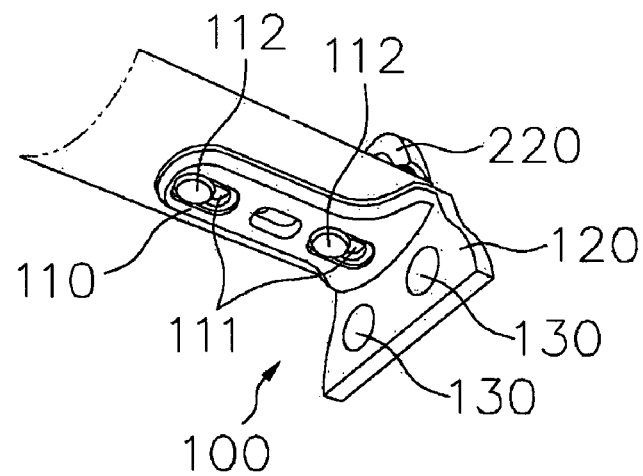

[Fig. 12]
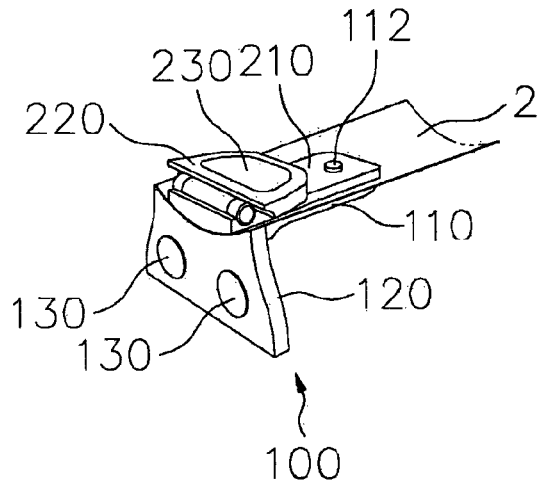
[Fig. 13]
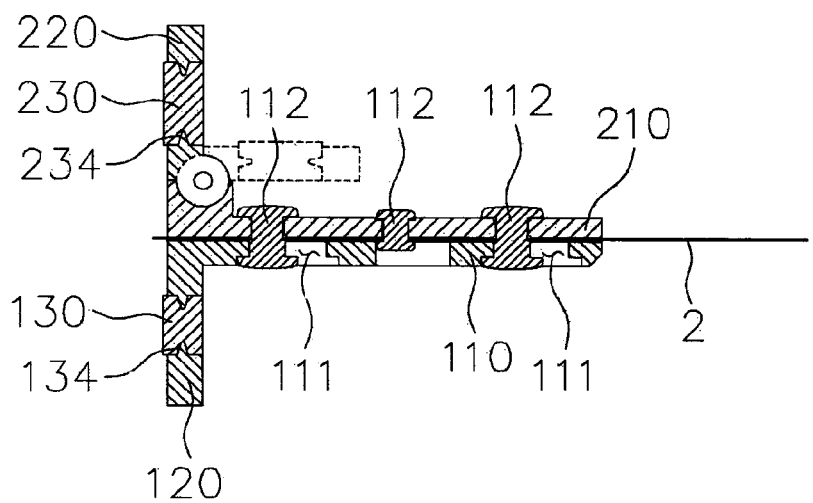
[Fig. 14]
(a) 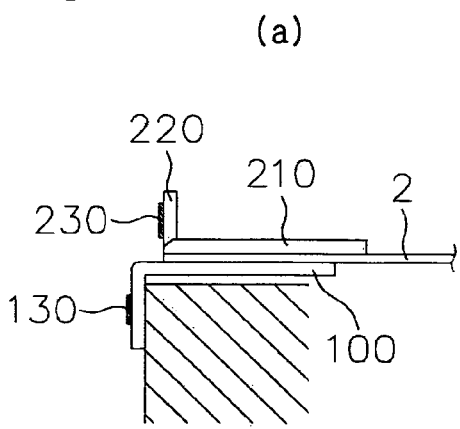   (b) 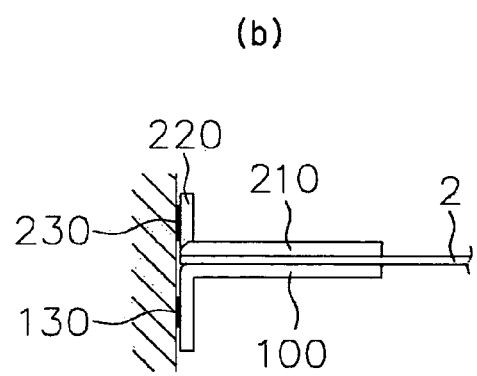

TAPE MEASURE WITH MAGNETIC TIP

BACKGROUND OF THE INVENTION

1. Field of the Invention

The present invention relates generally to a tape measure and, more particularly, to a tape measure having on its end hook a magnet.

2. Description of the Related Art

Generally, a tape measure has a blade which is wound on a bobbin elastically supported in a housing. An end hook provided on an end of the blade is exposed to the outside of a slot which is formed in the lower portion of a surface of a housing. The tape measure is constructed so that the blade is extended out from the housing when the end hook is pulled, and the extended blade is retracted into the housing by the elasticity of a spring when the end hook is released.

As a tape measure which provides convenience by attaching a magnet to the end hook of the tape measure, U.S. Pat. No. 6,678,967 which is entitled "MAGNETIC TIP FOR TAPE MEASURE AND METHOD OF USE" and was registered on Jan. 20, 2004 has been proposed.

According to the cited document, a hole is formed in the end hook, and a magnet having the same size as the hole is force fitted into the hole, so that the magnet is secured to the end hook.

This conventional tape measure requires a process of forming the hole in the end hook and a process of force fitting the magnet into the end hook, in addition to a general process of manufacturing the end hook, so that the work process is complicated.

Meanwhile, the conventional tape measure is constructed to prevent the magnet from being removed from the end hook thanks to force fitting. However, if the tape measure has been used for a lengthy period of time, so that parts fitted through force fitting become loosened from each other, or force fitting is loose from the beginning, the magnet may be removed from the end hook when the magnet is subjected to external shock.

That is, in the conventional tape measure, the side surface of the magnet must be flat for force fitting. However, the flat surface may cause the magnet to become undesirably removed from the end hook.

Up to now, it is known that this tape measure is the most improved tape measure and is of high value to consumers.

Meanwhile, as another tape measure having on its end hook a magnet, U.S. Pat. No. 7,240,439 which is entitled "MAGNETIC TAPE MEASURE END HOOK", was registered on Jul. 10, 2007, and corresponds to Korean Patent No. 10-0794440, has been proposed.

This is the most recent tape measure, which is constructed so that a magnet is disposed between a hooking section and a bezel. However, this conventional tape measure is problematic in that the bezel as well as a hook member must be additionally manufactured, and an additional construction for assembling the bezel with the hook member is required, so that the number of parts increases, and it is very complicated to manufacture the end hook.

SUMMARY OF THE INVENTION

Accordingly, the present invention has been made keeping in mind the above problems occurring in the prior art, and an object of the present invention is to provide a novel tape measure with a magnetic tip, in which a magnet is provided in an end hook of the tape measure in a more convenient manner, and the removal of the magnet from the end hook is more reliably prevented.

Another object of the present invention is to provide a novel tape measure with a magnetic tip, which has an integral coupling structure so that a magnet is not removed from an end hook even under the impact exerted by a standard drop test for a tape measure.

In order to accomplish the above objects, the present invention provides a tape measure with a magnetic tip, including a blade extending outside a housing, an end hook having an attachment end part coupled to a surface of an end of the blade and a hook end part bent from an end of the attachment end part, and a first magnet having a shape of a plate which is integrated with the hook end part in such a way that front and back surfaces of the first magnet are exposed to the outside and a side surface of the first magnet is surrounded by the hook end part through insert molding when the end hook is manufactured, and having a first coupling part in which a molten material for the hook end part permeates and solidifies when the hook end part is manufactured and which is parallel to a front surface of the hook end part. Here, interference between the first magnet having the first coupling part and the material for the hook end part permeating into the first coupling part prevents removal of the first magnet, the front surface of the first magnet is flush with the front surface of the hook end part or protrudes forwards from the front surface of the hook end part, and the back surface of the first magnet is flush with a back surface of the hook end part.

The attachment end part of the end hook may be slidably coupled to a first surface of the end of the blade.

The tape measure may further include a support plate secured to a second surface of the end of the blade, an auxiliary hook provided perpendicularly on an end of the support plate in such a way as to extend in a direction opposite to the hook end part, and a second magnet provided in the auxiliary hook through insert molding when the auxiliary hook is manufactured and having a second coupling part in which a molten material for the auxiliary hook permeates and solidifies when the auxiliary hook is manufactured. Here, interference between the second magnet having the second coupling part and the material for the auxiliary hook permeating into the second coupling part may prevent a removal of the second magnet, a front surface of the second magnet may be flush with the front surface of the first magnet when the first magnet moves backwards, and the front surface of the second magnet may be flush with the front surface of the auxiliary hook or may protrude forwards from the front surface of the auxiliary hook.

The auxiliary hook may be hinged to the support plate to be rotatable around the end of the support plate.

The first coupling part may comprise a groove formed along a central portion of a side surface of the first magnet, or a through hole passing through an interior of the first magnet. Further, a protrusion may protrude from the central portion of the side surface of the first magnet such that each of a front and a back of the protrusion serves as the first coupling part.

As is apparent from the above description, a tape measure with a magnetic tip according to the present invention is advantageous in that a magnet is provided in an end hook of the tape measure in a more convenient manner using insert molding, and the removal of the magnet from the end hook is more reliably prevented using a first coupling part.

Further, a tape measure with a magnetic tip according to the present invention is advantageous in that it has an integral coupling structure so that a magnet is not removed from an end hook even under the impact exerted by a standard drop test for a tape measure.

BRIEF DESCRIPTION OF THE DRAWINGS

The above and other objects, features and advantages of the present invention will be more clearly understood from the following detailed description taken in conjunction with the accompanying drawings, in which:

FIG. 1 is a perspective view illustrating a tape measure according to a first embodiment of the present invention;

FIG. 2 is a perspective view illustrating an end hook of FIG. 1;

FIG. 3 is an exploded perspective view of FIG. 2;

FIG. 4 is a conceptual sectional view of FIG. 2;

FIG. 5 is a view illustrating several modifications of a first magnet of FIG. 3 in a front view and a side view;

FIGS. 6 and 7 are views illustrating modifications of FIG. 4;

FIG. 8 is conceptual views illustrating the measurement of the first embodiment;

FIG. 9 to 11 are perspective views illustrating a tape measure according to a second embodiment of the present invention, in which the tape measure is seen from various angles;

FIG. 12 is a perspective view illustrating the state in which an auxiliary hook of FIG. 9 is folded;

FIG. 13 is a conceptual sectional view of FIG. 9; and

FIG. 14 is conceptual views illustrating the use of the tape measure according to the second embodiment of the present invention.

DESCRIPTION OF THE PREFERRED EMBODIMENTS

Hereinafter, the construction and operation of a tape measure according to the first embodiment of the present invention will be described in detail.

Figure 5:
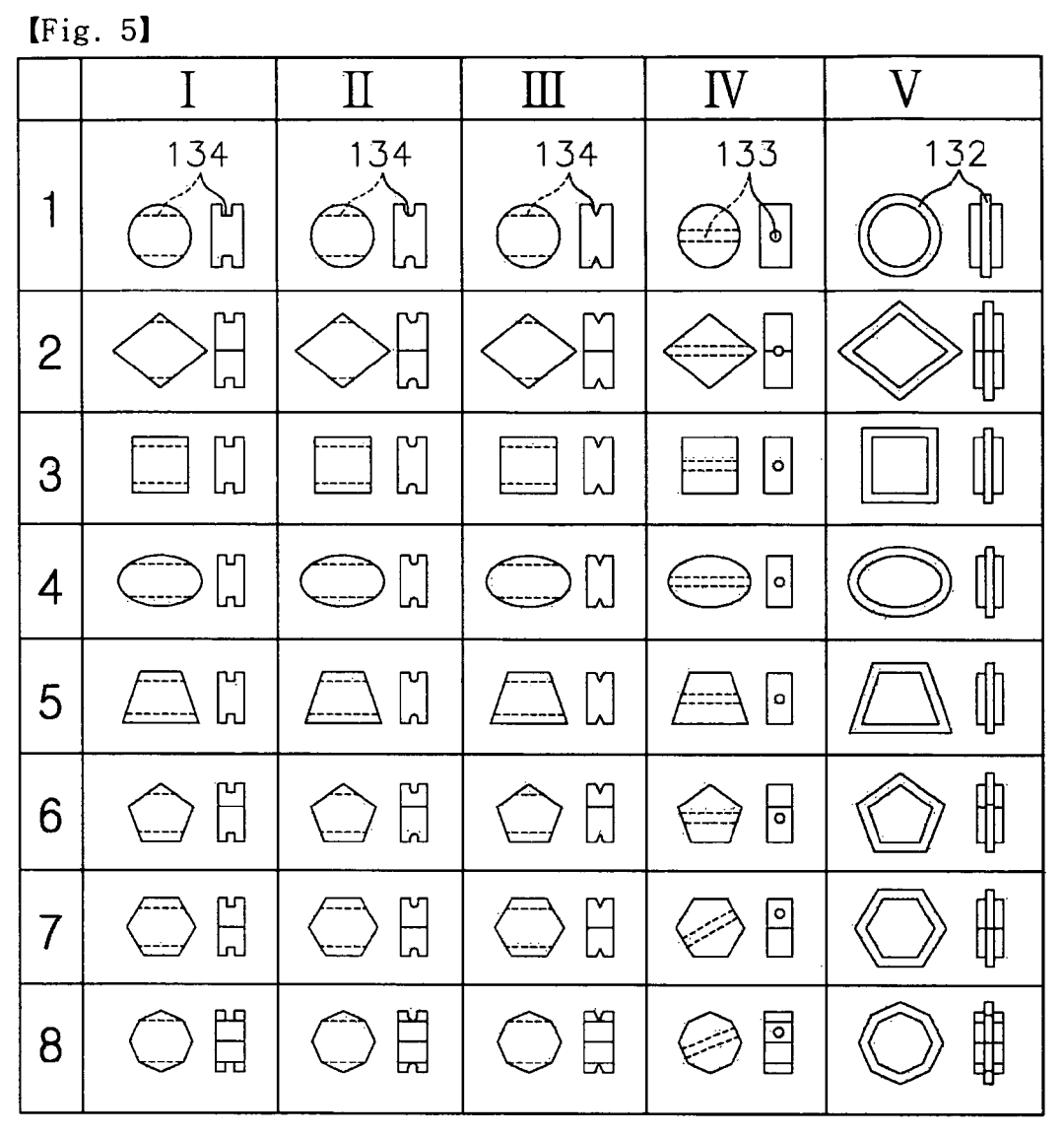

FIG. 1 is a perspective view illustrating a tape measure according to the first embodiment of the present invention, FIG. 2 is a perspective view illustrating an end hook of FIG. 1, FIG. 3 is an exploded perspective view of FIG. 2, FIG. 4 is a conceptual sectional view of FIG. 2, FIG. 5 is a view illustrating several modifications of a first magnet of FIG. 3 in a front view and a side view, and FIGS. 6 and 7 are views illustrating modifications of FIG. 4.

The magnetic tape measure includes a housing 1, a blade 2 which extends outside the housing 1, and an end hook 100 which is provided on a surface of an end of the blade 2.

Since the internal and external constructions of the housing 1 and the coupling shape of the blade 2 with the end hook 100 are known to those skilled in the art, a detailed description will be omitted herein.

The end hook 100 includes an attachment end part 110 and a hook end part 120. The hook end part 120 is bent from an end of the attachment end part 110.

The attachment end part 110 is slidably coupled to a surface (upper surface) of the end of the blade 2.

To this end, a plurality of slots 111 is formed in the attachment end part 110 in such a way as to be arranged in the longitudinal direction of the blade 2. A plurality of rivets 112, each having a size which is smaller than the longitudinal size of the slot 111, passes through the slots 111 to be fastened to the blade 2.

Thus, the sliding range of the attachment end part 110 is limited by the rivets 112. The attachment end part 110 may slide along the blade 2 within a limited range in the longitudinal direction of the blade 2 because of the coupling of the rivets 112 with the slots 111.

The sliding construction of the tape measure corrects an error due to the thickness of the end hook in the case of measuring in the state where the front surface of the end hook contacts an object or the state where the back surface of the end hook is hooked to an object, thus maintaining the accuracy of the tape measure.

Of course, the attachment end part 110 may be fixed to the end of the blade 2.

Two first magnets 130 are provided in the hook end part 120 of the end hook 100.

Each first magnet 130 has the shape of a plate. The first magnet 130 is integrally coupled to the hook end part 120 in such a way that the front and back surfaces of the first magnet 130 are exposed to the outside, and the side surface of the first magnet 130 is surrounded by the hook end part 120.

The front surface of the first magnet 130 is flush with the front surface of the hook end part 120 or protrudes slightly forwards from the front surface of the hook end part 120. Preferably, the back surface of the first magnet 130 is flush with the back surface of the hook end part 120.

More preferably, according to this embodiment, the front surface of the first magnet 130 protrudes slightly forwards from the front surface of the hook end part 120. Such a construction provides stronger magnetic coupling between the first magnet 130 of the end hook 100 and the object in the case of measuring in the state where the hook end part 120 of the end hook 100 contacts the object.

Further, more preferably, the back surface of the first magnet 130 is flush with the back surface of the hook end part 120. The reason is because a relatively small magnetic force is required in the case of measuring in the state where the hook end part 120 of the end hook 100 is hooked to the object and an error attributable to the thickness of the first magnet 130 is minimized.

The most important characteristic of this embodiment, that is, the coupling between the end hook 100 and the first magnets 130 will be described.

Each first magnet 130 is integrally coupled to the hook end part 120 by insert molding when the end hook 100 is manufactured.

The end hook 100 may be made of synthetic resin such as plastic, or made of a metal material such as zinc, aluminum, tin, copper, magnesium or metal alloy.

In order to manufacture the end hook 100, a molten end hook material is put into a mold for the end hook 100 and the end hook material is solidified.

As such a manufacturing method, an injection molding method may be used for the synthetic resin, and a die casting method may be used for the metal material.

As such, when the end hook 100 is manufactured through injection molding or die casting, the first magnets 130 may be inserted into the mold for the end hook 100. That is, first, the first magnets 130 are mounted to the mold for the end hook 100. In the state where a material for the hook end part 120 is melted (actually, there is a strong possibility that the material for the end hook 100 is equal to the material for the hook end part 120), the material surrounds the side surface of each first magnet 130 and thereafter is solidified, so that each first magnet 130 is integrated with the end hook 100.

The above manufacturing process allows the first magnets 130 to be integrally coupled to the hook end part 120.

It is preferable that the coupling of the end hook 100 with the first magnets 130 ensure sufficient structural integration to endure the impact exerted by a standard drop test.

To this end, each first magnet 130 has a first coupling part in which the molten material for the end hook 100 permeates and solidifies when the end hook 100 is manufactured. Interference between the end hook material permeating into the first coupling part and the first magnet 130 prevents the first magnet 130 from being removed from the hook end part 120.

The first coupling part is formed on each first magnet 130 in such a way as to be parallel to a plane which forms the front surface of the hook end part 120.

The shape of the first coupling part will be described with reference to FIG. 3 to 5, especially FIG. 5.

Columns 1 to 8 of FIG. 5 show several shapes (circle, diamond, rectangle, ellipse, trapezoid, pentagon, hexagon, and octagon) of magnets. As such, various shapes of magnets may be applied.

Further, the left side of each compartment of FIG. 5 is a front view, and the right side is a side view.

Rows I to V of FIG. 5 show several shapes of first coupling parts formed in the magnets.

As shown in rows I to III, as the first coupling part, a groove 134 is formed in the central portion of the side surface of the magnet. Of course, as shown in FIG. 5, various shapes of grooves 134 may be applied.

Row IV shows a through hole 133 which is formed through the magnet, as the first coupling part. Of course, the through hole 133 is formed in the first magnet in such a way as to be spaced apart from the front and back surfaces of the first magnet.

FIG. 6 is a conceptual sectional view illustrating the state in which the first magnet 130 having the through hole 133 as the first coupling part is coupled to the end hook 100.

As shown in row V, a protrusion 132 is provided on the central portion of the side surface of the magnet in such a way as to protrude, and each of the front and back of the protrusion 132 serves as the first coupling part.

FIG. 7 is a conceptual sectional view illustrating the state in which the first magnet 130 having the protrusion 132 as the first coupling part is coupled to the end hook 100.

As shown in the drawing, it can be seen that the material for the end hook 100 permeates into the front and back of the protrusion 132.

In order to make this invention more easily understood, FIG. 3 illustrates an exploded perspective view of FIG. 2. However, actually, it is apparent that the first magnets 130 are not separated from the end hook 100.

The problem of the first embodiment will be described with reference to FIG. 8.

FIG. 8 is conceptual views illustrating the measurement of the first embodiment.

(a) in FIG. 8 illustrates a measuring operation performed by hooking the back surface of the end hook 100 to the object and pulling the back surface. In this case, the end hook 100 slides forwards relative to the blade 2.

(b) in FIG. 8 illustrates a measuring operation performed by making the front surface of the end hook 100 contact the object and pushing the front surface. In this case, the end hook 100 slides backwards relative to the blade 2.

As such, only when the length of the object is measured as shown in FIG. 8(a) or FIG. 8(b), the tape measure may correct the error due to the thickness of the end hook 100 (including the first magnets 130).

However, when the first magnets 130 are disposed on the front surface of the end hook 100, the length of the object may not be measured as shown in FIG. 8(b) but may be measured as shown in FIG. 8(c). That is, when the first magnets 130 are magnetically attached to the object, the end hook 100 may slide forwards. Measurement is performed in such a state.

Thus, in the state of FIG. 8(c), a measurement error corresponding to the forward sliding length of the end hook 100 may occur.

In order to solve the problem, a tape measure according to the second embodiment of the present invention has been proposed.

FIG. 9 to 11 are perspective views illustrating the tape measure according to the second embodiment of the present invention, in which the tape measure is seen from various angles, FIG. 12 is a perspective view illustrating the state in which an auxiliary hook 220 of FIG. 9 is folded, FIG. 13 is a conceptual sectional view of FIG. 9, and FIGS. 14A and 14B are conceptual views illustrating the use of the tape measure according to the second embodiment of the present invention.

According to this embodiment, the end hook 100 is slidably coupled to the lower surface of an end of the blade 2, and a support plate 210 is secured to the upper surface of the end of the blade 2.

The construction of the end hook 100 is substantially equal to that of the end hook 100 of the first embodiment. The end hook 100 may slide within a predetermined range relative to the blade 2.

Further, the end hook 100 is provided with the first magnets 130.

The auxiliary hook 220 is perpendicularly provided on the front end of the support plate 210.

The auxiliary hook 220 is vertically provided in a direction opposite to the hook end part 120.

Especially, the auxiliary hook 220 is hinged to the support plate 210 to be rotatable around the end of the support plate 210, and may be converted from the state of FIG. 9 to the state of FIG. 12. FIG. 12 shows the state in which the auxiliary hook 220 is folded when the auxiliary hook 220 is not in use.

Although not shown in the drawings, a guide step is provided on a junction of the auxiliary hook 220 with the support plate 210 so that a spring or the like is inserted into the guide step, and functions to guide the rotary range of the auxiliary hook 220. Thereby, the tape measure of this embodiment may be converted to two states, that is, the state in which the auxiliary hook 220 is at right angles to the support plate 210 and the state in which the auxiliary hook 220 is folded. Preferably, the intermediate state may be released by the spring. To this end, the construction similar to that of opening and closing a folding-type mobile phone may be applied to the tape measure of this embodiment.

The auxiliary hook 220 is provided with a second magnet 230. The method of mounting the second magnet 230 to the auxiliary hook 220 may use the method of mounting the first magnets 130 to the end hook 100.

Thus, the second magnet 230 has a second coupling part in which a molten material for the auxiliary hook 220 permeates and solidifies when the auxiliary hook 220 is manufactured.

The second coupling part may comprise a groove, a through hole, or the front and back of a protrusion, similarly to the first coupling part.

For example, as shown in FIG. 13, it can be seen that a groove 234 serving as the second coupling part is formed in the second magnet 230.

Preferably, the front surface of the second magnet 230 is flush with the front surface of each first magnet 130 in the state where the first magnets 130 move backwards.

The use of the tape measure according to the second embodiment will be described with reference to FIG. 14.

FIG. 14 is conceptual views illustrating the measurement using the tape measure according to the second embodiment.

(a) in FIG. 14 shows the state in which the back surface of the hook end part 120 is hooked to the object and pulled to measure the length of the object. In this case, the end hook 100 slides forwards relative to the blade 2.

(b) in FIG. 14 shows the state in which the front surface of the end hook 100 is in contact with the object and pushed to measure the object. In this case, the second magnet 230 provided in the auxiliary hook 220 is magnetically attached to the object, and the end hook 100 slides backwards relative to the blade 2. The first magnets 130 are also attached to the object by magnetic force.

Thus, as shown in FIG. 14(B), although the tape measure uses the magnets, the end hook 100 moves backwards, so that an error attributable to the thickness of the end hook 100 can be corrected, and thus it is possible to measure a precise length.

Further, as shown in FIG. 14(B), both the first and second magnets 130 and 230 are simultaneously attached to the object by magnetic force, thus maximally preventing an end of the blade 2 from becoming removed from the object.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention is available as a magnetic tape measure.

What is claimed is:

1. A tape measure with a magnetic tip, comprising:
    a blade extending outside a housing;
    an end hook having an attachment end part coupled to a surface of an end of the blade, and a hook end part bent from an end of the attachment end part; and
    a first magnet having a shape of a plate which is integrated with the hook end part in such a way that front and back surfaces of the first magnet are exposed to the outside and a side surface of the first magnet is surrounded by the hook end part through insert molding when the end hook is manufactured, and having a first coupling part in which a molten material for the hook end part permeates and solidifies when the hook end part is manufactured and which is parallel to a front surface of the hook end part,
    wherein interference between the first magnet having the first coupling part and the material for the hook end part permeating into the first coupling part prevents removal of the first magnet, the front surface of the first magnet is flush with the front surface of the hook end part or protrudes forwards from the front surface of the hook end part, and the back surface of the first magnet is flush with a back surface of the hook end part.

2. The tape measure as set forth in claim 1, wherein the attachment end part of the end hook is slidably coupled to a first surface of the end of the blade.

3. The tape measure as set forth in claim 2, further comprising:
    a support plate secured to a second surface of the end of the blade;
    an auxiliary hook provided perpendicularly on an end of the support plate in such a way as to extend in a direction opposite to the hook end part; and
    a second magnet provided in the auxiliary hook through insert molding when the auxiliary hook is manufactured, and having a second coupling part in which a molten material for the auxiliary hook permeates and solidifies when the auxiliary hook is manufactured,
    wherein interference between the second magnet having the second coupling part and the material for the auxiliary hook permeating into the second coupling part prevents a removal of the second magnet, a front surface of the second magnet is flush with the front surface of the first magnet when the first magnet moves backwards, and the front surface of the second magnet is flush with the front surface of the auxiliary hook or protrudes forwards from the front surface of the auxiliary hook.

4. The tape measure as set forth in claim 3, wherein the auxiliary hook is hinged to the support plate to be rotatable around the end of the support plate.

5. The tape measure as set forth in claim 1, wherein the first coupling part comprises a groove formed along a central portion of a side surface of the first magnet.

6. The tape measure as set forth in claim 1, wherein the first coupling part comprises a through hole passing through an interior of the first magnet.

7. The tape measure as set forth in claim 1, wherein a protrusion protrudes from the central portion of the side surface of the first magnet such that each of a front and a back of the protrusion serves as the first coupling part.

* * * * *